United States Patent Office 3,134,641
Patented May 26, 1964

3,134,641
PROCESS FOR THE MANUFACTURE OF
CALCIUM HYPOCHLORITE
Robert D. Gleichert, Barberton, Ohio, assignor to Pittsburgh Plate Glass Company, Pittsburgh, Pa., a corporation of Pennsylvania
No Drawing. Filed Aug. 9, 1961, Ser. No. 130,257
3 Claims. (Cl. 23—86)

This invention relates to an improved process for the manufacture of calcium hypochlorite and more especially relates to the improvement of calcium hypochlorite quality.

Calcium hypochlorite has long existed as an item of commerce in the form of chlorinated lime which is obtained by direct chlorination of unslaked lime with moist chlorine as indicated by the following equation:

$$2CaO + 2Cl_2 \rightarrow Ca(OCl)_2 + CaCl_2$$

This method of preparation does not result in a pure calcium hypochlorite since all the initial impurities in the calcium oxide remain in the product with the calcium chloride which is formed. Increased demand for calcium hypochlorite having a higher calcium hypochlorite content has led to a variety of processes by which material containing 70 percent by weight or more calcium hypochlorite may be obtained. The more modern processes have, in common, reduced quantities of calcium chloride which material tends to render the hypochlorite hygroscopic and unstable. Thus, the more acceptable products are often characterized by lower calcium chloride content.

One commercial process involves the reaction of hypochlorous acid with calcium hydroxide in an aqueous slurry to result in a mixture of calcium hypochlorite, unneutralized calcium hydroxide, calcium chloride formed by decomposition and from small amounts of chloride in the hypochlorous acid, calcium chlorate resulting from the decomposition of calcium hypochlorite, and siliceous impurities present in the original calcium hydroxide. The formation of calcium hypochlorite by this process follows the simple neutralization Equation 1. If the temperature is allowed to rise, decomposition occurs according to Equations 2 and 3. Also, spontaneous decomposition may be caused by foreign substances such as iron to liberate oxygen as in Equation 3. Even hydrolytic decomposition can occur (4). Calcium carbonate may also be present as a result of the absorption of carbon dioxide from the atmosphere (5).

(1) $Ca(OH)_2 + 2HOCl \rightarrow Ca(OCl)_2 + 2H_2O$
(2) $3Ca(OCl)_2 \rightarrow Ca(ClO_3)_2 + 2CaCl_2$
(3) $Ca(OCl)_2 \rightarrow CaCl_2 + O_2$
(4) $Ca(OCl)_2 + 2H_2O \rightarrow Ca(OH)_2 + 2HOCl \rightarrow Cl_2O + H_2O$
(5) $Ca(OCl)_2 + CO_2 \rightarrow CaCO_3 + Cl_2O$ In such processes, the resulting slurry of calcium hypochlorite contains in addition to the impurities mentioned, dissolved calcium hypochlorite as well as some solid calcium hypochlorite, present as a hydrate or double salt. The neutralization step must be operated to avoid pH values of 9.5 or below, at which hypochlorite decomposes spontaneously. Commercially, this slurry is usually produced continuously and is withdrawn from the neutralizer into holding tanks from which it is in turn continuously fed to the drying system. The drying system in this and other processes usually consists of one or more spray driers where rapid evaporation is obtained with short contact time to minimize decomposition. Moist solids from the spray drier are then fed to a cascade or vacuum drier to procure the finally dried product.

Another type of process for the production of calcium hypochlorite involves separate preparations of sodium hypochlorite-sodium chloride solution and calcium hydroxide slurry. Part of the salt in the sodium hypochlorite-sodium chloride solution is present as solid salt which is removed by means of a centrifuge (Equation 6). The resulting clear soda bleach liquor is blended with calcium hydroxide slurry in another vessel in such proportion that the sodium hypochlorite present will be stoichiometrically equivalent to the calcium chloride which will be formed by chlorination of the mixture (Equation 7 followed by 8). This second chlorination is accomplished at 12° C. whereupon a triple salt $Ca(OCl)_2 \cdot NaOCl \cdot NaCl \cdot 12H_2O$ forms, Equation 9. This material is then isolated as large, pure crystals and mixed with a new chlorinated calcium hydroxide slurry in such proportion that the NaOCl of the triple salt is equivalent to the calcium chlorite present in the new calcium hypochlorite slurry (10).

(6) $2NaOH + Cl_2 \rightarrow NaOCl + NaCl\downarrow + H_2O$
(7) $2Ca(OH)_2 + Cl_2 \rightarrow CaCl_2 + Ca(OCl)_2 + 2H_2O$
(8) $2NaOCl + CaCl_2 \rightarrow Ca(OCl)_2 + 2NaCl$ (9) $Ca(OCl)_2 + NaOCl + NaCl + 12H_2O \xrightarrow{12°C} Ca(OCl)_2 \cdot NaOCl \cdot NaCl \cdot 12H_2O$

(10) $2Ca(OCl)_2 \cdot NaOCl \cdot NaCl \cdot 12H_2O + \underline{CaCl_2 + Ca(OCl)_2} \longrightarrow$
Chlorinated slurry
$4Ca(OCl)_2 + 4NaCl + 24H_2O$ This results in a paste containing primarily calcium hypochlorite and sodium chloride. The paste is dried to obtain finished product containing relatively nonhygroscopic sodium chloride. Impurities in this process are somewhat similar to those in the preceding process although different in amount.

The stability of calcium hypochlorite is enhanced by calcium hydroxide or sodium chloride but is decreased by calcium chloride. Manufacturers of calcium hypochlorite maintain free calcium hydroxide or sodium chloride or both in their product to improve stability. An amount of free calcium hydroxide sufficient to improve stability may be maintained by the deliberate and incomplete neutralization of calcium hydroxide in the calcium hypochlorite slurry. Sodium chloride also is often added for the purpose of providing a dilution to a standard concentration. Nevertheless, both sodium chloride and calcium hydroxide have the disadvantage that both decrease the efficiency of a given quantity of material. In addition to this disadvantage, calcium hydroxide tends to produce turbid solutions as a result of incomplete solubility. Therefore, it is desirable to maintain the lowest practical level of this material in the product.

Now it has been discovered that the properties and purity of calcium hypochlorite may be improved by the addition of an alkali metal salt thereto during manufacture. In this way the stability of the product is improved while increasing the hypochlorite content and simultaneously reducing the quantity of objectionable substances therein. As a result there is realized an increased capacity of the drying equipment and a lowered steam requirement. These benefits are reflected by an increased production.

In accordance herewith, these and other advantages may be realized during the manufacture of calcium hypochlorite from the reaction of calcium hydroxide with hypochlorous acid in an aqueous medium containing calcium hypochlorite and calcium chloride impurity by utilizing the improvement which comprises adding to the aqueous medium an alkali metal salt, notably sodium hypochlorite, in aqueous solution sufficient to provide from 0.5 to 1.5 moles of alkali metal salt per mole of calcium chloride therein while maintaining the slurry at a pH of 10 to 10.5.

In one specific embodiment of this invention, good results accrue in a continuous process for the manufacture of calcium hypochlorite comprising the continuous reaction of calcium hydroxide in an aqueous calcium hypochlorite slurry with a continuous stream of aqueous hypochlorous acid while adding to the slurry a stream of sodium hypochlorite sufficient to react with the calcium chloride content while maintaining the slurry at a pH of 10 to 10.5 and thereafter continuously withdrawing a stream of calcium hypochlorite slurry. The temperature of the slurry is advantageously maintained by means of brine coils at 70° F. Use of a pH recorder-controller assures proper control of calcium hydroxide rate of feed to maintain the desired pH value. Periodic chemical analyses indicate whether empirical adjustment is required in the rate of flow of the sodium hypochlorite feed which is roughly 1 percent by weight of the total solids content of the slurry. A continuous withdrawal from the reactor sufficient to maintain a constant level in the reactor assures withdrawal equivalent to the materials fed. This is most easily accomplished by a mere overflow arrangement connected to storage vessels.

It is not presently known how the invention operates. However, it is believed that under the conditions present in the reactor, sodium hypochlorite reacts by double decomposition with calcium chloride to form sodium chloride and calcium hypochlorite as indicated by Equation 8. Nevertheless, this leads to a product having reduced alkalinity. Moreover, the apparent calcium hypochlorite content and dried capacity are increased.

Other additives may be employed to produce beneficial results. These additives are generally those which are known to react with calcium chloride including trisodium phosphate, sodium oxalate, sodium carbonate, sodium hydroxide, potassium phosphate and sodium sulphate. The most practical compounds to utilize as additives are sodium hypochlorite and sodium hydroxide. These compounds have the advantage of being completely soluble and may also react with calcium chloride to form soluble sodium chloride. Sodium hypochlorite has the further advantage of increasing the hypochlorite content of the product.

In carrying out the neutralization, it is desirable to maintain as high a concentration of calcium hypochlorite in the slurry as is practical (to agitate) since all water must be ultimately removed in the driers. Thus, any concentration of calcium hypochlorite slurry may be maintained in the neutralizer from a complete solution containing as low as 5 percent by weight calcium hypochlorite to a slurry containing as much as 60 percent by weight calcium hypochlorite partially dissolved and partially in a suspended form. It is preferred, however, to operate such that a slurry containing approximately 80 percent by weight of water is obtained.

The following examples contain a comparison of actual plant operation wherein a stream of sodium hypochlorite is continuously added to the neutralizer with a corresponding period of operation without the benefit of such addition. The effectiveness of this invention in increasing the calcium hypochlorite assay and altering the ratio of sodium chloride to calcium chloride by the addition of sodium hypochlorite is also shown in these examples.

EXAMPLE I

In a brick-lined vat of 500 gallons capacity enclosed to exclude the atmosphere and equipped with brine coils for maintaining the temperature at 70° F., calcium hypochlorite slurry containing 80 percent by weight water is continuously prepared by the introduction of lime containing 95 percent by weight calcium hydroxide at a rate of 462 pounds per hour while continuously adding thereto a stream of 20 percent by weight of aqueous hypochlorous acid maintained at 70° F. and fed at a rate of 2,190 pounds per hour while controlling the rate of addition with a pH meter-controller in such a manner that the slurry is maintained at a pH of 10 to 10.5. Simultaneously a small stream of approximately 16 percent by weight aqueous sodium hypochlorite solution is continuously fed. This solution is prepared separately in a batch of 1,000 gallons containing 1,750 pounds of sodium hydroxide and 1,550 pounds of dissolved chlorine gas to form a 16 percent by weight aqueous solution. This is added to the calcium hypochlorite slurry at from 3.81 to 5.07 pounds per hour on the dry basis and is equivalent to from 4.3 to 5.7 percent by weight calcium chloride in the calcium hypochlorite slurry based on the anhydrous salt-free calcium hypochlorite present. Determination of the calcium chloride content of the slurry before sodium hypochlorite addition is made and the required sodium hypochlorite solution is calculated from this figure.

From the reactor in which the slurry is continuously prepared and stirred by means of an agitator a continuous stream of slurry is withdrawn at such a rate that the level in the reactor is held constant. This stream is taken to a storage tank. Calcium hypochlorite slurry is fed continuously to a spray drier at a rate of 7 gallons per minute while feeding thereto 40,000 cubic feet per minute of air at 320° F. The spray drier is of such a size that a retention time of approximately six seconds is allowed to minimize decomposition to yield a partially dried powder containing about 17 percent by weight water and about 98 percent by weight calcium hypochlorite on the anhydrous salt-free basis. This powder is then dried in a cascade drier to result in recovery of a product containing less than 2 percent by weight moisture. Operating in this manner for a period of 30 days results in a production of 16,400 pounds per day of material containing approximately 87 percent by weight of calcium hypochlorite on the anhydrous salt-free basis.

In a period of operation during which 522,000 pounds of production were prepared, the steam requirement was 5,220,000 pounds for the driers.

EXAMPLE II

The procedure of Example I was repeated but the stream of sodium hypochlorite added to remove calcium chloride was omitted. The production obtained in a 30 day period was 14,600 pounds per day of material containing 85 percent by weight calcium hypochlorite on the anhydrous salt-free basis. Table I contains the complete analyses of the product obtained from Example I and from Example II on an anhydrous salt-free basis.

In a period of operation during which 462,000 pounds of product were produced, 5,340,000 pounds of steam were required for both driers.

*Table I*

| Component | Composition, Weight Percent | |
|---|---|---|
| | Sodium Hypochlorite Added | No Sodium Hypochlorite Added |
| Calcium hypochlorite | 86.80 | 85.10 |
| Calcium chloride | 0.96 | 1.94 |
| Calcium chlorate | 3.76 | 3.56 |
| Calcium hydroxide | 4.0 | 5.24 |
| Calcium carbonate | 3.59 | 3.33 |
| Steam required, pounds per pound of product | 10.0 | 11.6 |

EXAMPLE III

Calcium hypochlorite slurry containing approximately 1 percent by weight calcium chloride treated with a sodium hypochlorite solution in an amount stoichiometrically equivalent to the calcium chloride acquires a calcium hypochlorite content which is near a maximum in the dry solids obtained by evaporating the hypochlorite solution. The thermal decomposition temperature is simultaneously improved in proportion to the sodium chloride which should result. Moisture absorption on exposure to high humidity is also reduced. This is shown as follows.

The following solutions were prepared.

A. Calcium hypochlorite neutral slurry containing:
   234.5 grams per liter calcium hypochlorite
   2.0 grams per liter calcium chloride
B. Soda bleach solution containing:
   173.5 grams per liter sodium hypochlorite
   141.0 grams per liter sodium chloride
   16 grams per liter sodium hydroxide
   9.1 grams per liter sodium carbonate
C. Hypochlorous acid solution containing:
   168.1 grams per liter hypochlorous acid
   0.1 gram per liter hydrogen chloride
D. Calcium chloride solution containing: 50 grams of calcium chloride per 100 grams of solution Portions of calcium hypochlorite neutral slurry were treated with (1) nothing; (2) 1.56 milliliters of solution B and 1.94 milliliters of solution C per 100 milliliters of solution A; and (3) 3.12 milliliters of solution B and 3.88 milliliters of solution C per 100 milliliters of solution A. In addition, 20 milliliters of solution D were treated with 77.4 milliliters of solution B and 9.6 milliliters of solution C. Samples of all four products were then evaporated in vacuum at 35° C. at approximately 1 milliliter mercury pressure. After the evaporation the samples were maintained under vacuum for approximately four hours and finally dried in a vacuum oven under 30 inches of mercury vacuum at 120° C. The following results were obtained:

*Table II*

| Product on Drying | Calcium Hypochlorite Treated With— | | | Calcium Chloride Treated with 1 Equivalent of Sodium Hypochlorite |
|---|---|---|---|---|
| | Nothing | 1 Equivalent of Sodium Hypochlorite | 2 Equivalents of Sodium Hypochlorite | |
| Sample | 1 | 2 | 3 | 4 |
| Moles Hypochlorite ion per 100 grams | 1.220 | 1.302 | 1.224 | 0.430 |
| Calcium hypochlorite, Percent by weight | 87.26 | 90.30 | 87.52 | 30.77 |
| Thermal decomposition temperature, °C | 171 | 173 | 180 | ¹ 260 |
| Moisture absorption at 93 percent relative humidity and 28° C., percent by weight after 6 hours | 19.1 | 16.6 | 16.5 | 6.2 |

¹ Gradual decomposition.

EXAMPLE IV

The procedure of Example II was repeated in a series of six tests. The first three tests of this series, each one day in duration, were carried out without adding anything additional to the neutralizer. In the next three tests each was run for a period of one day while adding electrolytic cell liquor at the rate of 10 gallons per hour. This cell liquor contained 10 percent by weight sodium hydroxide and approximately 14 percent by weight sodium chloride. During each test samples were taken from the finished product, and from the customary analyses the sodium chloride and calcium chloride contents were obtained. Table III contains the results of these tests and shows that the calcium chloride was greatly reduced in the series of three tests in which cell liquor was added.

*Table III*

| | Nothing Added | | | Cell Liquor Added | | |
|---|---|---|---|---|---|---|
| | Test 1 | Test 2 | Test 3 | Test 4 | Test 5 | Test 6 |
| Sodium chloride, percent by weight | 0.21 | 0.02 | 0.01 | 3.50 | 2.40 | 2.14 |
| Calcium chloride, percent by weight | 1.91 | 3.58 | 2.88 | <0.10 | 0.3 | 0.62 |

Best results accrue when the amount added is stoichiometrically equivalent to the calcium chloride content. From 0.5 to 1.5 times this amount is generally useful. This amount is usually equivalent to less than 7 percent by weight of the calcium hypochlorite slurry. Larger amounts may lead to decreased stability.

The sodium hypochlorite may be added as an aqueous solution containing up to about 30 percent by weight. Any concentration below this is useful but high dilutions result in additional expenditure for steam to evaporate the added water. The preferred concentration is approximately 16 percent by weight sodium hypochlorite. Other sodium salts may be added therewith as diluents. Noteworthy is sodium chloride which is often added later in the process to dilute the calcium hypochlorite product. A convenient source of sodium hypochlorite is the reaction product of chlorine with 50 percent by weight sodium hydroxide. Such a product contains about 16 percent by weight sodium hypochlorite and about 20 percent by weight sodium chloride.

Other methods of carrying out the invention may be visualized. For example, it is feasible to carry out the invention disclosed herein by a batch process rather than the continuous process described.

While the present invention has been described by reference to specific details of certain embodiments, it is not intended to limit the invention thereto except in so far as appears in the following claims.

I claim:

1. In a process for the manufacture of calcium hypochlorite wherein calcium hydroxide with hypochlorous acid are added to an aqueous medium containing calcium hypochlorite and calcium chloride, the improvement which comprises adding 0.5 to 1.5 equivalents of alkali metal hypochlorite per equivalent of calcium chloride in the medium while maintaining the pH of the medium at 10.0 to 10.5.

2. In a process for the manufacture of calcium hypochlorite by the reaction of calcium hydroxide with hypochlorous acid, containing a minor amount of free chlorine, in an aqueous medium containing calcium hypochlorite and calcium chloride, the improvement which comprises adding 0.5 to 1.5 equivalents of sodium hypochlorite per equivalent of calcium chloride in the slurry while maintaining the pH of the slurry at 10.0 to 10.5.

3. In a process for the manufacture of calcium hypochlorite wherein calcium hydroxide and hypochlorous acid are added to an aqueous medium containing calcium hypochlorite and calcium chloride, the improvement which comprises simultaneously adding in an amount up to 7 percent by weight of said medium a solution containing from 0.5 to 1.5 equivalents of sodium hypochlorite per equivalent of calcium chloride in the medium while maintaining the medium at pH 10.0 to 10.5.

References Cited in the file of this patent

UNITED STATES PATENTS

| 1,787,048 | MacMullin et al. | Dec. 30, 1930 |
| 1,916,770 | Reitz et al. | July 4, 1933 |
| 2,429,531 | Soule | Oct. 21, 1947 |

FOREIGN PATENTS

| 321,720 | Great Britain | Nov. 18, 1929 |